US006524683B1

(12) United States Patent
Roussel et al.

(10) Patent No.: US 6,524,683 B1
(45) Date of Patent: Feb. 25, 2003

(54) SHEET OF EMBOSSED ABSORBENT PAPER, AND A METHOD AND DEVICE FOR PRODUCING SAME

(75) Inventors: Gilles Roussel, Colmar (FR); Rémy Ruppel, Durrenentzen (FR)

(73) Assignee: Georgia-Pacific France, Kunheim (FR)

( * ) Notice: Subject to any disclaimer, the term of this patent is extended or adjusted under 35 U.S.C. 154(b) by 0 days.

(21) Appl. No.: 09/600,198

(22) PCT Filed: Jan. 11, 1999

(86) PCT No.: PCT/FR99/00029

§ 371 (c)(1),
(2), (4) Date: Jul. 26, 2000

(87) PCT Pub. No.: WO99/36253

PCT Pub. Date: Jul. 22, 1999

(30) Foreign Application Priority Data

Jan. 13, 1988 (FR) ........................................ 98 00230

(51) Int. Cl.[7] ............................ B32B 3/00; B31F 1/20; B31F 1/12; B29C 67/20

(52) U.S. Cl. ...................... 428/172; 428/154; 264/175; 162/109; 162/112; 156/209

(58) Field of Search ................................ 428/154, 156, 428/166, 172, 212; 162/111, 112, 109, 113, 289; 264/167, 175, 241, 257, 293; 156/209, 219

(56) References Cited

U.S. PATENT DOCUMENTS 5,173,351 A * 12/1992 Ruppel et al. .............. 428/154
5,573,830 A 11/1996 Schultz
5,693,403 A 12/1997 Brown et al.

FOREIGN PATENT DOCUMENTS

| | | | |
|---|---|---|---|
| CA | 2201018 A1 | 9/1997 | |
| FR | 2 335 345 | 7/1977 | |
| WO | WO 96/18771 | 6/1996 | |
| WO | WO 97/48551 | 12/1997 | |

* cited by examiner

*Primary Examiner*—Donald J. Loney
(74) *Attorney, Agent, or Firm*—Breiner & Breiner, L.L.C.

(57) ABSTRACT

The present invention relates to a sheet (1, 2) of absorbent paper, in particular made of cellulose cotton and of a specific surface weight between 10 and 40 g/m$^2$, comprising a first embossed zone such as is provided by embossing between an undeforming cylinder (A12) fitted with protrusions and a cylinder fitted with a resilient cladding (C) in such manner that the sheet (1, 2) comprises on one side in particular frustoconical salients (120, 110) of which the tops are situated substantially in one plane. The salients (110, 120) corresponding to recesses on the opposite side, the sheet being characterized in that the first embossed zone (110) constitutes a background base pattern of which the number of salients of height H1 relative to the plane is greater than 30 per cm$^2$, and in that it comprises at least a second pattern (G) constituted of salient-free zones of which the height H2 relative to the plane is greater than H1. The invention furthermore concerns the manufacture of such a sheet and to apparatus designed to implement the method.

12 Claims, 4 Drawing Sheets

SHEET OF EMBOSSED ABSORBENT PAPER, AND A METHOD AND DEVICE FOR PRODUCING SAME

Figure 1:
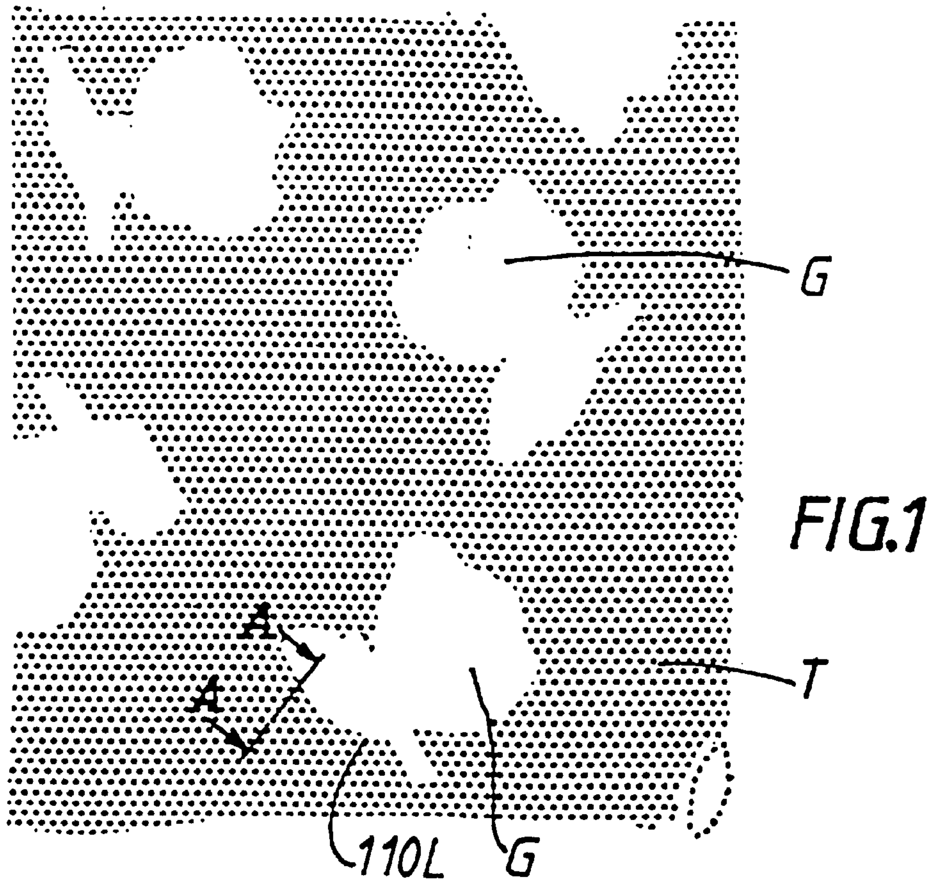

The present invention relates to sanitary or household absorbent papers, and in particular to a sheet consisting of at least one embossed ply and foremost used as toilet paper, though also applicable to handkerchiefs, napkins and paper towels.

As regards the manufacturing industry for sanitary and household papers, the material used is a low-weight and generally creped paper called cellulose cotton or wadding paper or tissue paper. Because of its stretchability, illustratively made possible by the creping, the sheet lends itself to being embossed. The embossing operation permanently deforms certain sites to produce protrusions on one side which correspond to recesses on the other side.

Regarding sanitary products, the trend of recent years has been to make them softer and more resilient by controlling thickness and strength, in particular by embossing. Such embossing also improves product appearance. Embossing is carried out either on high-moisture paper, i.e., within the wet portion of the papermaking machine, or on low-moisture paper, i.e., in the conversion stage. In the latter case, a dry sheet wound off a master reel in the papermaking machine will be processed. The present invention relates to the paper converted in the dry portion.

The most commonplace embossing patterns constitute a geometric repetition of elementary protrusions of small cross-sections and assuming simple geometric shapes. One embodiment is disclosed in U.S. Pat. No. 3,414,459 which relates to a stratified sheet of several elementary foils, called plies, which are bonded to one another. The plies are embossed at a protrusion density and height to attain water-absorbing products, for example, paper towels. The number of elements ranges from 5 to 30 per $cm^2$. Applicant moreover has developed, in particular regarding sanitary papers, certain patterns with a higher number of elements ranging from 30 to 80 per $cm^2$. These elements subtend very small individual top surfaces less than 1 $mm^2$. Such latter embodiments imitate the looks of woven products. One such example is described in European Patent 426,548. This kind of embossing mainly affects the thickness of such a sheet. However, its aesthetics is modest.

In order to improve visual attractiveness, patterns have already been proposed of which the protrusion rate is much lower than in the above cited patterns, preferably being less than 2,000 elements per $m^2$, and wherein the individual surface of the pattern-constituting protrusions is higher. The elements can fit into a polygon of 2 to 6 $cm^2$. European Patent 265,298 describes one embodiment mode. In this Patent, cross-sections of the element-forming protrusions are elongated and their peaks are linear. The curves so subtended preferably are closed and impart a raised-fabric look to the pattern elements. Moreover, as the elements are comparatively spaced far apart, they subtend wide and smooth zones of which the smoothness is unaffected by embossing. This set of pattern features imparts customer-perceived softness and resiliency to the paper. On the other hand, this kind of pattern only modestly affects the paper's physical properties, in particular, the thickness changes little and it was found that embossing efficacy is less. In order to gain thickness, the cylinders must be engraved at a relatively substantial depth.

Applicant in its French Application 94 15196 of Dec. 16, 1994 proposed combining the advantages of the two embossing modes to implement a sheet presenting both a graphics pattern composed of linear protrusions and a background pattern comprising small protrusions. The width of the linear protrusions, which in general are mutually apart, is between 0.1 and 2 mm. In general, the small protrusions are frustoconical and they are configured at a density of at least 30 per $cm^2$. The background pattern provides the main part of the functional features relating to embossing, namely thickness and absorption in particular. Moreover, the high density of the background pattern's protrusions leads to an eye-pleasing, textile appearance.

The background pattern's protrusions emphasize the main pattern because they are hardly visible to the naked eye on account of their small size. Their surface at the top is less than 1 $mm^2$. Such a contrast is achieved in particular by the high ratio between the surface of an element of the graphics pattern to that of a small protrusion, which is higher than 50, and by the high number of small protrusions per unit surface.

Nevertheless, when manufacturing a sheet made according to this Patent, the graphics pattern, which is salient relative to the cylinder, is pressed against the embossing rubber just as are the tips of the background pattern. Accordingly, there is competition between the two types of embossing. In particular, because of their small size, the tips provide more embossing than the graphics pattern. As a result, the graphics pattern loses marking and resolution qualities.

Moreover, because the protrusions are frustoconical, a neutral transition zone exists between the background pattern and the graphics pattern. The contours in this zone are fuzzy since it is generally determined by the tips in the rim zone according to a geometric pattern and by the free-shape contours of the graphics pattern.

The object of the invention is to create a sheet of absorbent paper which, in particular as compared to the latter embodiment above, offers improved pattern resolution and emphasizes the background pattern.

The invention relates to a sheet of absorbent paper, in particular of tissue paper, and of a specific surface weight of 10 to 40 $g/m^2$. The sheet comprises a first embossed zone of the kind provided by embossing being carried out between an undeforming cylinder fitted with protrusions and a cylinder fitted with a resilient cladding, such as rubber. Accordingly, the sheet comprises on one side salients of which the tops are substantially situated in a plane P. Recesses corresponding to the protrusions are present on the opposite side. The sheet is characterized in that the first embossed zone constitutes a background base pattern of which the number of salients of height H1 relative to the plane P is larger than 30 per $cm^2$ and in that the sheet further comprises at least a second, so-called graphics pattern constituted of salient-free zones and of a height H2 relative to the plane P which is larger than H1.

Surprisingly, it was found that on the side including the recesses, i.e., the side intended for the user, the graphics pattern offers a marked contrast relative to the background base pattern provided the graphics pattern is offset in height from the background. This solution is indeed contrary to that disclosed in French Application 94 15196 wherein the graphics pattern is defined by recess zones such as constitute the background base pattern.

The absorbent sheet of paper of the invention can include a single thickness, or one ply. However, the invention also relates to designs where the sheet includes several jointly embossed tissue paper plies.

H1 and H2 are mean values calculated using a number of appropriate statistical measurements.

In particular, the patterns shall be well defined when, following embossing, the sheet is sufficiently deformed so that H2 is 1.2 times H1.

In another feature of the invention, the mean diameter of disks which fit into the salient-free zones of the graphics pattern shall exceed the mean diameter of disks which fit between the salients of the base zone, preferably the former diameter being at least twice, and in particular, three-fold the latter.

A disk is considered to fit into a given surface portion if it is inside the portion while tangent to three of its salients.

In another feature of the invention, the second pattern includes at least two adjacent salient-free zones which are bounded from each other by isolated salients.

A salient is considered "isolated" if the mean height H of the sheet portion enclosing it is greater than the height H1 of the background zone. In this manner the salient differs from a base pattern salient of which the mean height of the sheet enclosing it is exactly H1.

In a preferred embodiment of the invention, the salients constitute an alignment.

In another feature of the invention, the dimensions of the tops of the isolated salients are the same as those of the salients of the first zone.

This design provides the advantage of greater pattern unity and it enhances contrast because smaller salients of the embossing cylinder concentrate stresses and more sharply mark the sheet at the time of embossing. Lastly, engraving is easier than if the protrusions were of different dimensions. A single tool set can be used.

In another feature of the invention, salient-free zones of the second pattern include at least one calendered surface portion. Calendering results from the rubber cylinder resting against the bottom of the engraving. Thereupon roughness suppression smoothes the surface. Calendering improves softness, especially if this portion is large enough to favor touch. For that reason the calendered surface portion is at least 1 $cm^2$, corresponding substantially to the skin portion of the finger tip making contact with the gripped sheet.

In another feature of the invention, the sheet of absorbent paper comprises two plies of which at least one shall be one of the absorbent plies. The absorbent plies are configured onto each other with the salients inside the structure. The two plies can be assembled in an arbitrary manner, for example, by knurling or bonding. The latter operation includes "hot melt" or cold gluing using a PVA-type adhesive. The plies can be mutually offset in order that the graphics patterns shall coincide less than perfectly, and in this manner, the plies shall be partly combined. In this manner, the combination can be modulated and the sheet can be stiffened or made more flexible depending on the number of tip-to-tip combination zones that are left. Lastly, the plies can be fitted with different patterns.

The present invention also relates to the apparatus and method allowing manufacture of the sheet of the invention.

The apparatus is characterized in that it comprises at least one undeforming cylinder comprising a first zone of at least 30, in particular frustoconical, protrusions per $cm^2$ and at least one graphics pattern zone devoid of protrusions and of which the depth relative to the protrusion tops is at least equal to that of the first zone, the mean diameter of disks fitting into the second zone being greater than that of disks fitting into the first zone.

In another feature of the invention, two second graphics pattern zones are adjacent but mutually separated by isolated protrusions.

In yet another feature of the invention, the apparatus comprises a cylinder fitted with a resilient cladding and cooperating with an undeforming cylinder, its resiliency being such that, in operation, the resilient material can make contact with the bottom of the second zones without contacting the bottom of the first zones.

The manufacturing method for such a sheet includes embossing the sheet using resiliently clad cylinders by applying enough pressure so that the sheet's deformation in the zones of the graphics patterns entail, with due account for the papers elastic restoration, a final height which locally exceeds that of the background zone.

Accordingly, the solution of the invention involving the combined graphics and background patterns allows eliminating the additional function of the prior art's graphics pattern. In particular, the invention attains more deformation at the rim tips of the graphics pattern, achieving thereby enhanced marking in this zone. As a result, pattern contrast is improved. This enhanced marking also opposes partial crushing, for example, when winding the sheet following embossing.

The invention is elucidated below in relation to the attached drawings.

Figure 2:
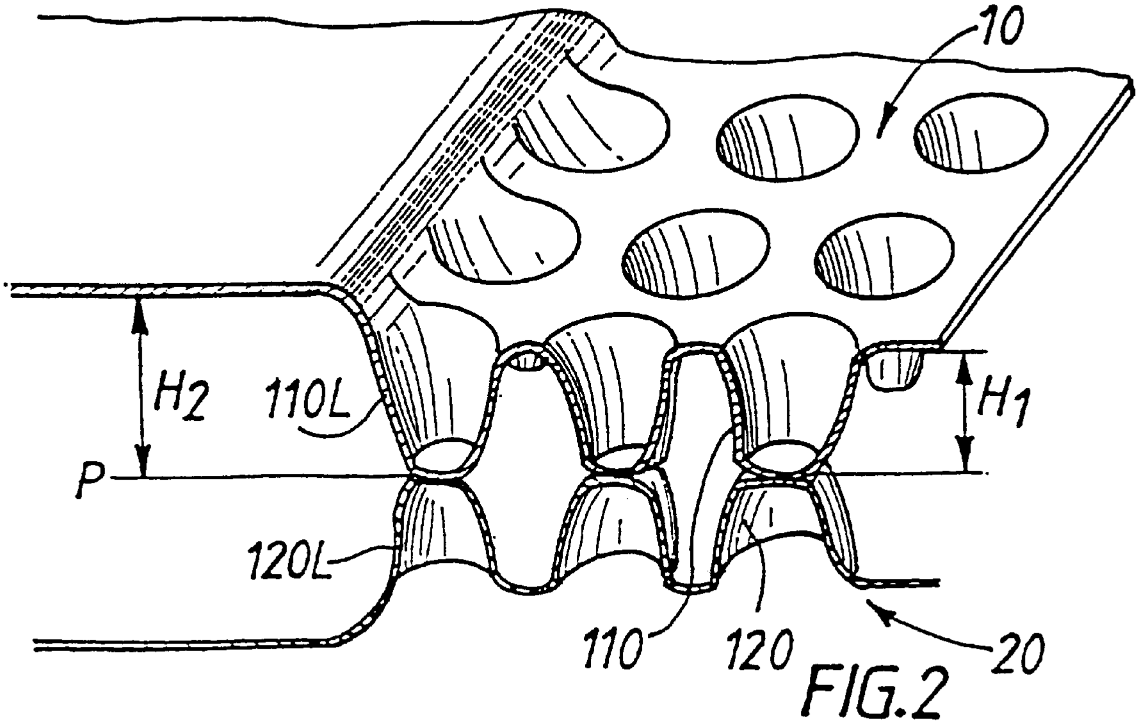
Figure 3:
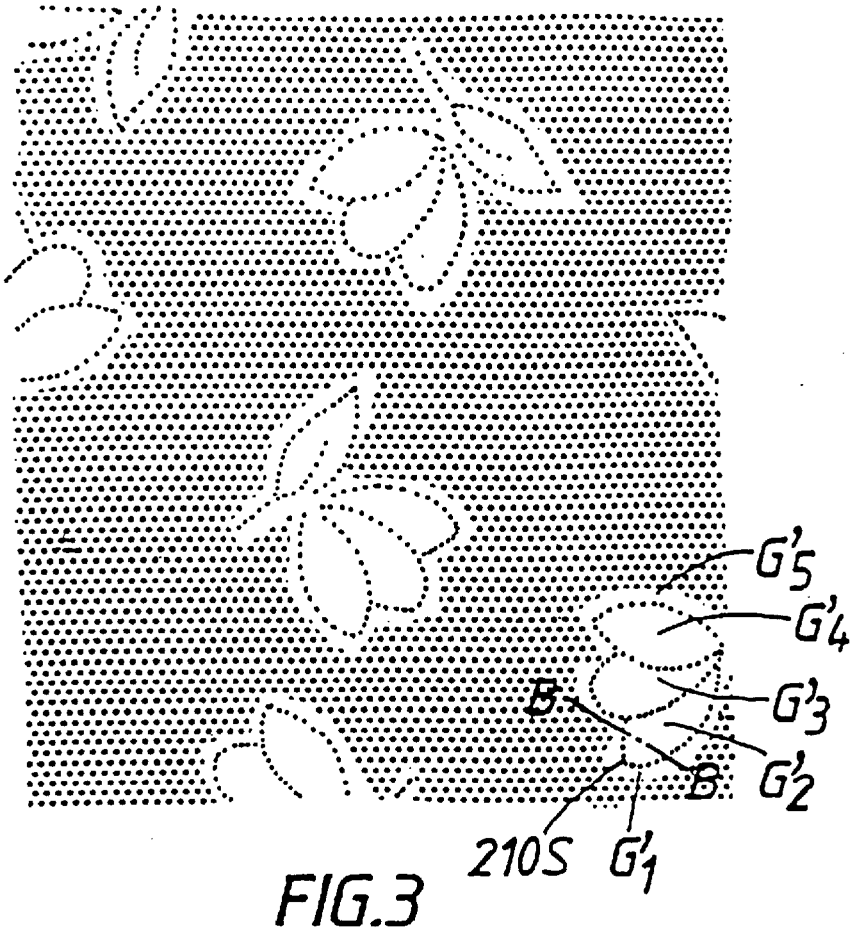
Figure 4:
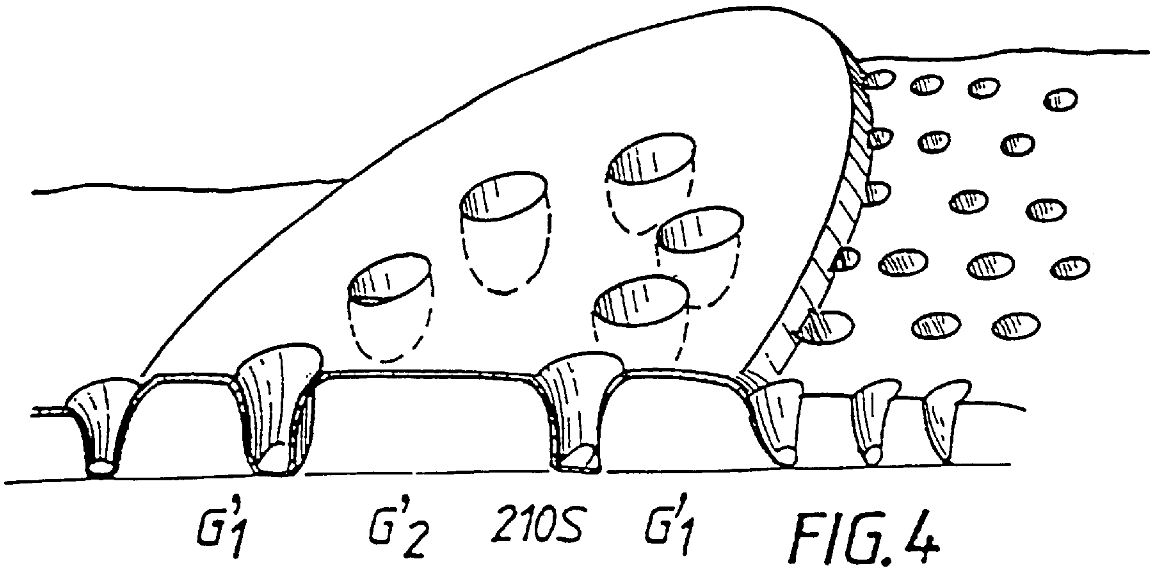
Figure 5:
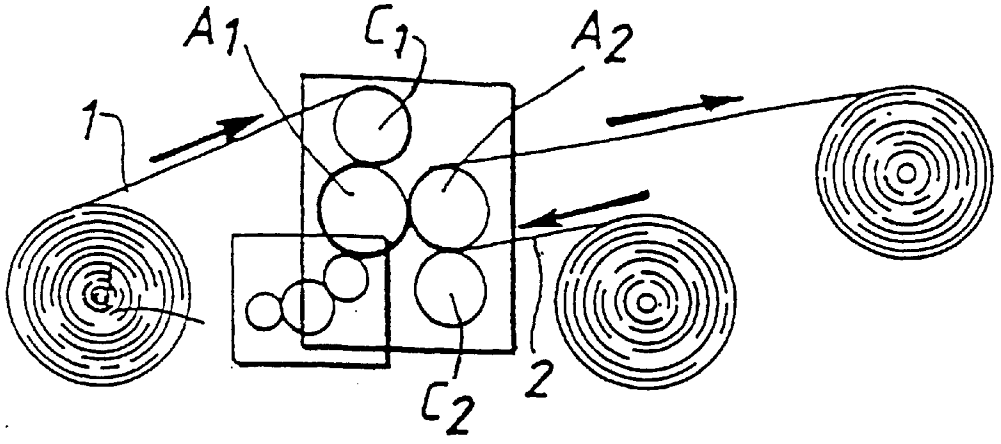
Figure 6:
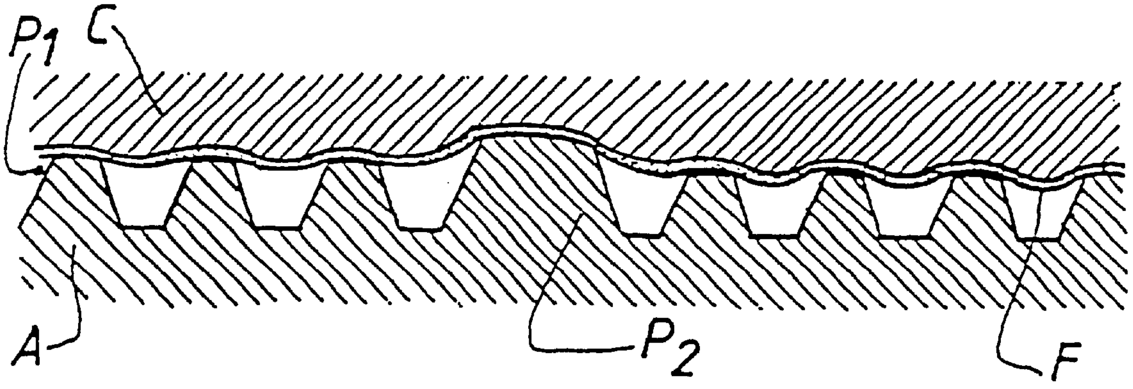
Figure 7:
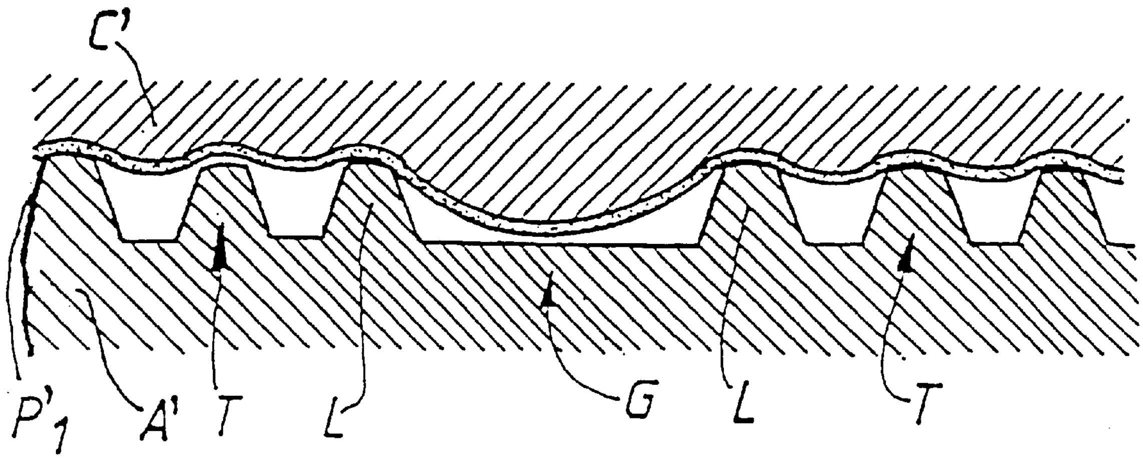
Figure 8A:
Figure 8B:

FIG. 1 illustrates a top view of the sheet of the invention,

FIG. 2 is an enlarged view of the sheet of FIG. 1, in perspective in a section along line A—A, FIG. 3 illustrates another embodiment of the invention, FIG. 4 is an enlarged perspective view in cross-section along line B—B of the sheet of FIG. 3, FIG. 5 shows embossing apparatus with which to make the product of the invention, FIG. 6 schematically shows an embossing procedure of the prior art, FIG. 7 schematically shows an embossing method of the invention, and FIGS. 8*a* and 8*b* show two photographs of cross-sections of samples of the invention.

The sheet shown in FIGS. 1 and 2 comprises two superposed plies 10 and 20 each of which illustratively are of creped cellulose cotton having a specific surface weight between 10 and 40 $g/m^2$. The two plies were previously embossed separately and then combined to form a two-ply sheet. The outer surfaces of the two plies constitute the outer surfaces of the two-ply sheet.

FIG. 1 is a top view and each dot shown therein represents a recess in the sheet's surface. These embossed recesses are crater-shaped. Accordingly, each recess in one side of the plies 10, 20 is associated with a protrusion, or salient, on the other side. FIG. 2 shows a perspective of the sheet along a line A—A of FIG. 1. The salients 110 and 120 are configured inside the structure and top against top. In this embodiment, the two plies are identical. The salients are frustoconical and the cross-section parallel to the sheet's surface is circular. The cross-section also may be oval, polygonal or other. Instead of being merely frustoconical, the shape of the salients also can be more complex. For example, the shape may comprise a frustoconical portion and a cylindrical portion. FIG. 2 shows a special case wherein the salients coincide perfectly. In practice, the pitches of the salients may differ in at least one direction in order to provide an offset between the patterns and partial association. In other words, in the latter case, not all the salients are bonding, some will be at least partly free. They are not in a tip-to-tip configuration. In this case, there is contact between the tip and the bottom.

FIG. 1 shows that each ply comprises a first embossed zone, i.e., a background base pattern T of a given thickness H1. The thickness of this zone is determined by the difference between the level of the sheet's outer surface and the reference plane P defined by the tops of the salients 110, 120 of FIG. 2. In the embodiment shown in these Figures, and for each ply 10, 20, second zones subtending a graphics pattern G are configured inside the first zone of the background base pattern. Each second zone G1, G2 etc. is bounded by salients of the first zone. Those are the rim salients 110L, 120L. Besides lacking salients, a second zone is characterized by a thickness H2. As is done for the background zone, the thickness H2 is determined by the height difference between the same plane P and the plane tangent to the sheet's outer surface in this zone and parallel to the plane P. Because of the configuration of the sheet of the invention, the thickness H2 is greater than the thickness H1. Surprisingly, it was discovered that the contrast between the graphics pattern and the background pattern can be implemented by a height difference between these two zones. In order to attain satisfactory contrast between the patterns G and T, the ratio of H2/H1 advantageously is greater than 1.2 (H2 being larger by at least 20% than H1). Actually, the higher this ratio, the better the contrast. The 110L salients are denoted as rim salients or rim recesses depending on considering the outer or the inner surface and assume different shapes from the other salients of the background zone, whereby the boundary between the G and T zones is visibly enhanced. Because of the difference in levels of the outer planes of G and of T, the wall of the rim recesses is extended on the side of the adjacent zone G. The optical result is contrast. It was noted that such a post-embossing level-differential will suffice. Surprisingly, this contrast persists even after some crushing of the structure of the sheet, for example, caused by winding the sheet.

In order to impart a textile look to the sheet, an embossing density of at least 30 salients per $cm^2$, preferably greater than 60 salients per $cm^2$, are selected for the background zone. When the density is less than $30/cm^2$, the separation between the salients becomes comparatively large and entails a reticular rather than a weave background effect.

The graphics pattern may consist of discrete elements arrayed in a repetitive pattern on the sheet in the manner shown in the Figures. Preferably, the mean diameter of the disks which can be inserted between them is at least twice, in particular five-fold, that of a disk inserted between the salients of the background zone.

In one (not shown) embodiment, the graphics pattern is continuous, for example, a square grid. In this case, the width of the zone between two rows of rim recesses may not be unduly narrow in order to assure a level differential between the background zone and the square grid. The least disk which can be fitted inside the graphics zone also preferably is of a diameter at least twice that of a disk which fits between the salients of the background zone.

Another embodiment is shown in FIGS. 3 and 4, wherein each graphics element is composed of two or more adjacent second zones G'1, G'2, G'3, G'4, G'5 . . . constituting a third zone G'. In this design, two adjacent zones G1 and G2 are separated by isolated salients 210S constituting a preferably unique alignment. Preferably again these salients subtend a diameter at the top which does not differ from the background zone, and in particular, the distance between the salients in the alignment corresponds to the pitch of the background zone. This or these alignment(s) serve(s) to sharpen or reinforce the graphics pattern resolution. A satisfactory result is attained adhering to the background resolution. This emphasizing effect produced by aligning isolated salients is observed to be due to the greater relative depth of these recesses relative to those of the background zone. This feature arises from the tops of the protrusions being at the same levels as the others.

FIG. 5 shows apparatus for converting cellulose cotton to render it fit for the manufacture, for example, of toilet paper. This apparatus comprises two embossing units each consisting of an undeforming cylinder A1, for example, made of steel and fitted with protrusions, and a cylinder C1 clad with a resilient material, such as rubber, and an undeforming cylinder A2, for example, made of steel and fitted with protrusions, and a cylinder C2 clad with a resilient material, such as rubber. Two plies 1 and 2 from a cellulose cotton mother spool are individually guided through the embossing gap of a unit A1, C1 and A2, C2, respectively, and then are combined by being made to pass between the cylinders A1 and A2 rolling against each other to form a single two-ply sheet. In the embodiment shown, the configuration is the tip-to-tip type, others however being possible, for example, with nesting protrusions. Moreover, the two plies may be connected by bonding, also mechanically, for example, by knurling.

By hugging the shape of the protrusions, the plies deform into frustoconical salients on the side making contact with the rubber cylinder and crater-shaped recesses on the ply side making contact with the rigid cylinder. The present invention also relates to the mode of embossing the plies.

FIG. 6 shows the deformation of a sheet of tissue paper made when embossing in the manner of the prior art. For a given pattern, the pressure applied by the rubber cylinder C and the elastic properties of the material constituting its cladding will determine its depth of penetration inside the engraving. This Figure in particular shows schematically the deformation produced on a tissue paper sheet by a pattern according to the French Application 94 15 196. This Figure is a cross-section along the axis of rotation of the cylinders of the contact zone between the rubber cylinder C and a steel cylinder A with the ply F inserted between them. The cylinder is fitted with small protrusions $P_1$ constituting a background base pattern and of protrusions $P_2$ rising above the protrusions $P_1$. Because of the small spacings between the protrusions, the rubber does not penetrate as far as the bottom of the engraving. There is, as shown, competition between the graphics-pattern protrusions on one hand and the background protrusions $P_1$ on the other. The protrusions $P_1$ being more embossing, the graphics pattern is less marked.

In the present invention, the protrusions of the embossing cylinder are selected in a manner to define the first and second zones.

A first, so-called background zone, includes at least 30 protrusions per $cm^2$. These protrusions are frustoconical in general, however they also may be frustoconical at the base and cylindrical at the top. Their cross-section may be circular, oval, polygonal or other. The height is sufficient to allow deforming the rubber around each tip. However, this deformation is limited by the inherent properties of the rubber being used and by the spacing between tips. This spacing, as well as the top surface, which is roughly 1 $mm^2$, are determined by the comparatively high density the purpose of which is to impart a weave appearance to this zone.

A second zone is one lacking an embossing tip. Furthermore, its extent is adequate to allow the rubber to penetrate deeper than is the case for the first zone under normal operating conditions. In practice and as regards a rubber-clad cylinder with a rubber shore hardness of 45 A, the extent of a second zone is such that the mean diameter of the disks which can be fitted inside this zone shall be twice that of the disks which can be fitted between three protrusions of the adjacent background zone.

In this manner, by uniformly engraving or milling a cylinder, a base pattern can be created in simple manner to constitute the first zones and thereupon milling off in selective manner the embossing tips present in the second zones.

FIG. 7 shows an engraving of the invention and the deformation applied to a tissue paper ply during embossing. Two first zones T separated by a second zone G are present at the cylinder surface. The ply deforms under the pressure applied by the rubber cylinder. However, the rubber does not rigorously hug the engraving's contour. Because of the slight spacing between the embossing tips, the rubber fails to reach the bottom of the zones T. Accordingly, it reaches a depth $H_g$ which is less than the depth of the engraving which in turn depends both on the available space between the embossing tips and on the applied load and this relation can be represented by an efficiency $R_p$ ($R_p$ is less than 1). Due to being creped, furthermore, the tissue paper is restored to a degree after the stress applied by the rubber cylinder has been lifted. This elastic restoration can be specified as an efficacy $R_t$ which is less than 1. As a result, the final thickness of the ply in the background zone can be stated as $E_t=H_g\times R_p\times R_t$.

A space has been selected in the graphics zone G which is sufficient to allow the rubber to deform over the full engraving height. Considering the elastic restoration of the paper, the thickness in the zone G can be stated as $E_g=H_g\times R_t$. Thus, once embossed, the product comprises first and second zones of different heights as measured relative to the plane of the tops of the protrusions.

Besides this difference in levels, this embossing procedure also offers rim protrusions L which are more effective in marking because the ply at this site is more deformed than around the base embossing tips. This difference contributes to enhancing the contrast between the zones T and G.

In a particular embodiment of the invention, the second zone shall be sufficiently large to allow the rubber to come to rest against the base surface. In that case, the ply portion is calendered and smoothed.

In another embodiment, two or more second zones are grouped to vary the patterns. In this case, two adjacent zones are separated by a row of isolated embossing tips. In this case, the two protrusions separating two second zones also lead to strong marking.

Tests

Samples B1 and B2 were made from plates engraved with the patterns shown in FIGS. 1 and 3, and cuts as shown in FIGS. 8*a* and 8*b* were made. FIG. 8*a* clearly shows the first background zone T and the second zone G which are situated at different levels and comprise a rim salient 110L. FIG. 8*b* furthermore shows an isolated salient 210S.

Furthermore, a sample B3 was made of a square grid pattern wherein the minimum width of the second zone was equal to twice the mean diameter of disks fitting into the adjacent background zone, while making sure the rubber then touched the engraving bottom. The height was measured at several sites of the sample using a photograph enlarged 56×. The mean values are listed below, in mm on the photograph.

| Pattern | Mean Height, Zone T | Mean Height, Zone G | Significance Index* | Height Ratio G/T | Ratio of Mean Diameters |
|---|---|---|---|---|---|
| B1 | | | | | >5 |
| st | 19.5 | 29.16 | 3.35 | 1.49 | |
| sm | 16.35 | 25.5 | 7.83 | 1.56 | |
| B2 | | | | | >10 |
| st | 15.3 | 30.6 | 8.57 | 2 | |
| sm | 14.3 | 25.3 | 7.33 | 1.77 | |

-continued

| Pattern | Mean Height, Zone T | Mean Height, Zone G | Significance Index* | Height Ratio G/T | Ratio of Mean Diameters |
|---|---|---|---|---|---|
| B3 | | | | | about 2 |
| sm | 21.5 | 27.8 | 2.66 | 1.29 | |

*This index is the mean height divided by the standard deviation.

It follows that a significant height ratio G/T exists for the patterns B1 and B2. There is a differential of the means which is 7–8 fold the standard deviation, allowing statistically ruling out random causes and proving significance.

However, even for a pattern of which the spacing inside the zone G is smaller, a ratio of at least 1.2 will be possible by proceeding in a manner assuring adequate rubber penetration into this zone.

What is claimed is:

1. A sheet of absorbent paper made of tissue paper and having a specific surface weight of 10 to 40 g/$m^2$, comprising a first embossed zone formed by embossment between an undeforming cylinder comprising protrusions and a cylinder fitted with a deforming cladding such that said sheet is provided with frustoconical salients on one side, tops of said salients being situated substantially in one plane and said salients corresponding to recesses on a second side; wherein the first embossed zone comprises a background base pattern of which the salients of a first height (H1) relative to said plane are present in a number greater than 30 per $cm^2$, at least one second pattern including salient-free second zones situated within the first embossed zone and having a second height (H2) relative to said plane which is greater than the first height, and wherein a mean diameter of disks which fit into the salient-free second zones is greater than twice a mean diameter of disks which fit between the salients of the background base pattern.

2. The sheet as claimed in claim 1 wherein the second height of the salient-free second zones is such that H2>(1.2) H1.

3. The sheet as claimed in claim 1 wherein each salient of the second pattern includes at least two adjacent salient-free second zones which are bounded from each other by isolated salients.

4. The sheet as claimed in claim 3 wherein tops of the isolated salients are of a size same as tops of the salients of the first zone.

5. The sheet as claimed in claim 1 wherein the second zone comprises at least a calendered surface portion.

6. The sheet of claim 1 comprising two plies, said two plies being joined to each other in such a manner that the salients of each ply are situated inside the sheet.

7. The sheet as claimed in claim 6 wherein the two plies are partly joined to each other.

8. Apparatus for manufacturing a sheet as claimed in one of claims 1, 2, 3, 4, 5, 6 or 7 comprising at least one undeforming cylinder comprising a first zone having at least 30 protrusions per $cm^2$ and a salient-free second zone having a depth relative to protrusion tops which is at least equal to that of the first zone, and in that a mean diameter of disks which fit into the second zone is greater than that of disks which fit into the first zone.

9. Apparatus as claimed in claim 8 wherein two of said second zone are adjacent but separated by isolated protrusions.

10. Apparatus as claimed in claim 8 further comprising a cylinder fitted with a resilient cladding and cooperating with said undeforming cylinder and having a resiliency such that in operation the resilient cladding can contact a bottom area of the second zone without making contact with a bottom area of the first zone.

11. A method for embossing an absorbent sheet made of tissue paper and having a specific surface weight of between 10 and 40 $g/m^2$ comprising passing an absorbent sheet between an undeforming cylinder fitted with protrusions distributed in such a manner as to constitute a first zone and a second zone, the first zone forming a background base pattern, and a cylinder fitted with a resilient cladding, a mean diameter of disks which fit into the second zone being twice as great as a mean diameter of disks which fit into the first zone, making the resilient cladding penetrate engraving of the first zone to a first depth and making the resilient cladding enter the second zone to a greater depth in such a way that residual height of the protrusions is of greater height in the second zone relative to the first zone.

12. The method as claimed in claim 11 wherein the resilient cladding is deformed to a depth which is sufficient to make the sheet contact a bottom area of an engraving of the second zone.

* * * * *